United States Patent [19]

Seki et al.

[11] Patent Number: 4,675,800
[45] Date of Patent: Jun. 23, 1987

[54] POWER CONVERTER WITH A FAILURE DETECTOR OF A SELF-TURN-OFF SEMICONDUCTOR ELEMENT

[75] Inventors: Nagataka Seki; Kosaku Ichikawa, both of Fuchu, Japan

[73] Assignee: Kabushiki Kaisha Toshiba, Kawasaki, Japan

[21] Appl. No.: 664,384

[22] Filed: Oct. 24, 1984

[30] Foreign Application Priority Data

Nov. 2, 1983 [JP] Japan ................................ 58-204914

[51] Int. Cl.$^4$ .............................................. H02H 7/10
[52] U.S. Cl. .................................. 363/68; 307/252 C; 307/252 L; 363/136
[58] Field of Search ...................... 363/57, 58, 68, 136, 363/137; 307/252 C, 252 L, 252 Q

[56] References Cited

U.S. PATENT DOCUMENTS

| | | | |
|---|---|---|---|
| 3,842,337 | 10/1974 | Ekström et al. | 363/68 |
| 3,878,448 | 4/1975 | Jackson et al. | 363/68 |
| 4,384,248 | 5/1983 | Matsuda et al. | 363/58 |
| 4,464,585 | 8/1984 | Seki . | |
| 4,536,816 | 8/1985 | Matsumura et al. | 363/57 |

FOREIGN PATENT DOCUMENTS

56-136023  6/1981  Japan .

Primary Examiner—Clifford C. Shaw
Attorney, Agent, or Firm—Oblon, Fisher, Spivak, McClelland & Maier

[57] ABSTRACT

A power converter including a plurality of serially connected self-turn-off semiconductor elements, including a first control circuit for producing a plurality of control signals, and a plurality of second control circuits is connected to receive respective of the control signals to supply a non-conduction control signal to a respective of the self-turn-off semiconductor elements to turn off the respective semiconductor element. The power converter further includes a plurality of failure detectors and blocking circuits. Each of the failure detectors is connected to a respective of the self-turn-off semiconductor elements for detecting a fault thereof to produce a fault detection signal when the respective self-turn-off semiconductor elements has failed. Each of the blocking circuits is connected to the respective failure detector and to the first control circuit for blocking either the respective control signal or the respective non-conduction control signal based on the respective fault detection signal.

9 Claims, 12 Drawing Figures

POWER CONVERTER WITH A FAILURE DETECTOR OF A SELF-TURN-OFF SEMICONDUCTOR ELEMENT

BACKGROUND OF THE INVENTION

1. Field of the Invention

This invention relates generally to a power converter and more particularly to a power converter including a circuit having a plurality of serially connected self-turn-off semiconductor elements.

2. Description of the Prior Art

Gate turn-off thyristors (hereinafter referred to as GTO thyristors), static induction thyristors, power transistors and field effect transistors are called self-turn-off semiconductor elements based on the fact that conduction and non-conduction states can be controlled by signals to be fed into the control electrodes (which are called gates or bases) of the respective elements. Such semiconductor elements have been significantly developed in larger capacity in recent years, and have been widely applied to larger capacity power converters such as inverters, choppers and converters.

In general, when semiconductor elements are to be used in a high voltage circuit whose voltage exceeds the breakdown voltage of an individual of the semiconductor element, a plurality of the semiconductor elements are arranged in series connection such that the voltage shared by the respective semiconductor element becomes less than the breakdown voltage thereof. When the aforementioned power converter is constructed of a plurality of serially connected self-turn-off semiconductor elements, at least one element is added to the serially connected elements for the sake of redundancy to increase the reliability thereof. Namely even when one semiconductor element fails in a power converter constructed with n pieces of serially connected semiconductor elements, the power converter can continue its operation with a (n−1) pieces of serially connected operative semiconductor elements.

It is well known that a GTO thyristor or a static induction thyristor of the self-turn-off semiconductor elements can be turned on or turned off in terms of the anode current by application of an on-gate signal or an off-gate signal to its control electrode (generally called "gate").

Figure 1:
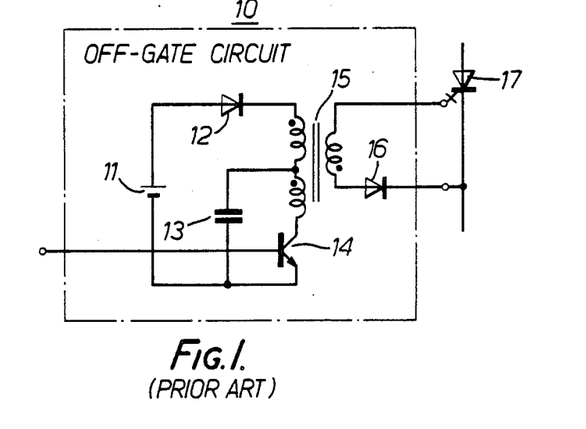
FIG. 1 is a diagram illustrating an example of an off-gate circuit of a GTO thyristor.

FIG. 1 shows an example of an off-gate circuit 10 suitable for a GTO thyristor. The off-gate circuit 10 includes a DC power source 11, a diode 12, a capacitor 13, a transistor 14, a pulse transformer 15 and a diode 16, and outputs an off-gate signal to a GTO thyristor 17. The operation of this circuit is described in detail in the Japanese patent disclosure No. 56-136023, so that the detailed description thereof is omitted. In FIG. 1, when the GTO thyristor 17 operates normally there is generated a certain impedance between the cathode and the gate thereof, namely it is operated with a Zener characteristic. So that the off-gate current becomes, after the decrease of the anode current, a current whose amount is determined by the Zener characteristics between the cathode and the gate. But if the GTO thyristor 17 is to be operated for a long time under the condition that the cathode is short-circuited to the gate, the components in the circuit 10 such as the capacitor 13, the transistor 14 and the diode 16 should be increased in the rated current.

Because of the particularity that a self-turn-off semiconductor element such as a GTO thyristor has an internal structure of multi-parallel emitter configuration, there is an extremely strong possibility that when it is once damaged due to some causes, the portions between the anode and the cathode and between the gate and the cathode thereof become absolutely short-circuited. Therefore when the power converter which is constructed with serially connected self-turn-off semiconductor elements and is provided with a proper redundancy in the number of the serially connected semiconductor elements is essentially required to maintain its continuous operation even when at least one of the semiconductor elements is damaged, it is not economical to supply continuously the control current such as the off-gate current to the failed self-turn-off semiconductor element.

SUMMARY OF THE INVENTION

Accordingly, the objects of this invention are to provide a highly economical and reliable power converter constructed of a plurality of serially connected self-turn-off semiconductor elements and provided with a proper redundancy in the number of the serial elements, which can decrease the components in the circuit for controlling the self-turn-off semiconductor element even during operation of the rated current.

These and other objects of this invention can be achieved by providing a power converter including a plurality of serially connected self-turn-off semiconductor elements, a first control circuit for producing a plurality of control signals, a plurality of second control circuits connected to the first control circuit for receiving respective of the control signals to supply a respective non-conduction control signal to a respective of the self-turn-off semiconductor elements to turn off the respective semiconductor elements. The power converter further includes a plurality of failure detectors and a plurality of blocking circuits. Each of the failure detectors is connected to a respective of the self-turn-off semiconductor elements for detecting a fault thereof to produce a fault detection signal when the respective of the self-turn-off semiconductor elements has failed. Each of the blocking circuits is connected to a respective of the failure detectors and to the first control circuit for blocking either the respective control signal or the respective of the non-conduction control signal based on the respective fault detection signal.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 2:
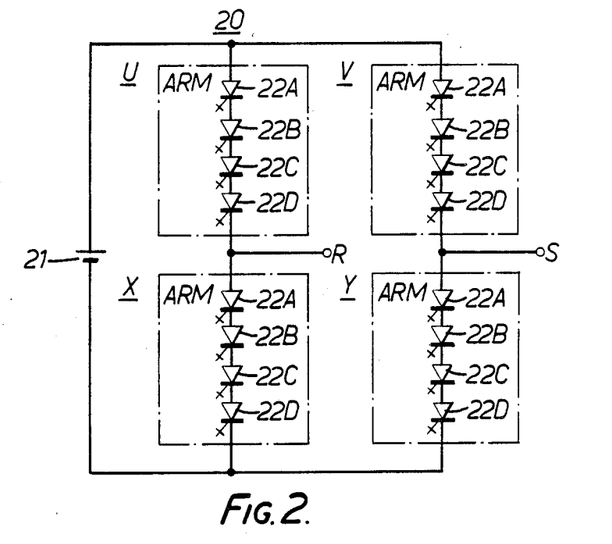
FIG. 2 is a block diagram of a power converter according to a preferred embodiment of this invention.

Referring now to the drawings, wherein like reference numerals designate identical or corresponding parts throughout the several views, and more particularly to FIG. 2 thereof, wherein one preferred embodiment of this invention is shown, reference numeral 20 designates a power converter such as a single-phase inverter. In FIG. 2, the single-phase inverter 20 includes a DC power source 21 and bridge-connected four arms U, V, X and Y. Each of the arms U, V, X and Y includes four serially connected GTO thyristors 22A, 22B, 22C and 22D as the self-turn-off type semiconductor elements and is constructed with the redundancy that even when one of the four GTO thyristors 22A, 22B, 22C and 22D fails the single-phase inverter 20 can maintain its continuous operation. In FIG. 2, R and S designate output terminals of the single-phase inverter 20.

Figure 3:
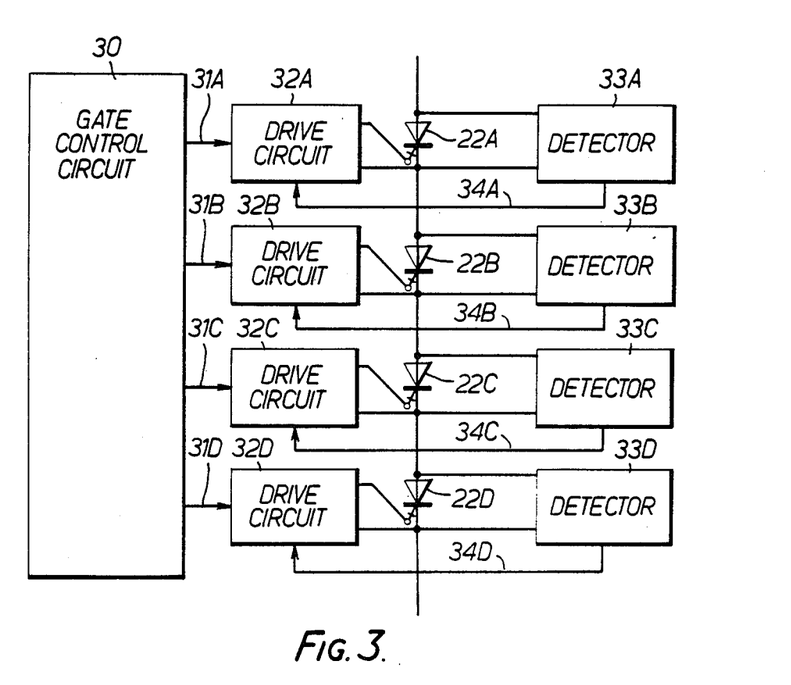
FIG. 3 is a detailed circuit diagram of each of the arms U, V, X and Y shown in FIG. 2.

FIG. 3 shows a detailed circuit configuration of each of the arms U, V, X and Y. In FIG. 3 a gate control circuit 30 outputs control signals 31A, 31B, 31C and 31D. The gate control circuit 30 is well known to those skilled in the art, so that detailed description thereof will be omitted. Drive circuits 32A, 32B, 32C and 32D receive control signals 31A, 31B, 31C and 31D from the gate control circuit 30, respectively. Detectors 33A, 33B, 33C and 33D detect voltages between anodes and cathodes of the serially connected GTO thyristors 22A, 22B, 22C and 22D and output signals 34A, 34B, 34C and 34D to the drive circuits 32A, 32B, 32C and 32D based on the detected voltages so as to control the operation of the drive circuits 32A, 32B, 32C and 32D, respectively.

Figure 4:
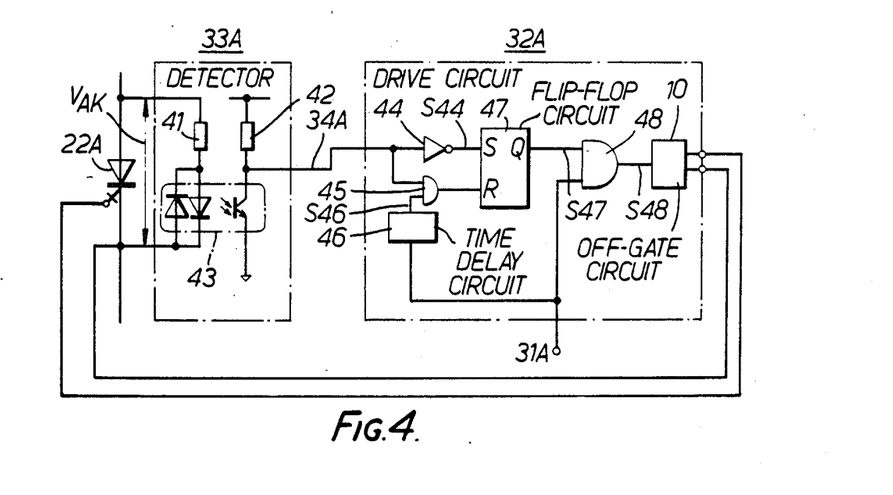
FIG. 4 is a detailed circuit diagram of the drive circuit 32A and the detector 33A shown in FIG. 3.

Hereinafter the drive circuits 32A, 32B, 32C and 32D and the detectors 33A, 33B, 33C and 33D will be described in detail. FIG. 4 shows an example of a circuit configuration of the drive circuit 32A and the detector 33A. In FIG. 4, the detector 33A includes resistors 41 and 42 and a photo-coupler 43 and is connected between the anode and cathode of the GTO thyristor 22A. The detector 33A detects a voltage $V_{AK}$ between the anode and the cathode of the GTO thyristor 22A and outputs the signal 34A based on the detected voltage $V_{AK}$. The drive circuit 32A includes a NOT circuit 44, an AND circuit 45, a time-delay circuit 46, a flip-flop circuit 47, an AND circuit 48 and the off-gate circuit 10 shown in FIG. 1.

In FIG. 4, the signal 34A outputted from the detector 33A is applied to the input terminal of the NOT circuit 44 and also to a first input terminal of the AND circuit 45. The control signal 31A from the gate control circuit 30 is applied to a second input terminal of the AND circuit 45 through the time-delay circuit 46 as a signal S46. An output signal S44 of the NOT circuit 44 is applied to a set terminal of the flip-flop circuit 47. An output signal of the AND circuit 45 is applied to a reset terminal of the flip-flop circuit 47. An output signal S47 at a Q terminal of the flip-flop circuit 47 is applied to a first input terminal of the AND circuit 48. The control signal 31A is further applied to a second input terminal of the AND circuit 48. An output signal S48 of the AND circuit 48 is applied to the base terminal of the transistor 14 in the off-gate circuit 10. The off-gate circuit 10 generates an off-gate signal which is applied between the cathode and the gate of the GTO thyristor 22A. The drive circuits 32B, 32C and 32D and the detectors 33B, 33C and 33D are constructed as same as the drive circuit 32A and the detector 33A, respectively.

Figure 5:
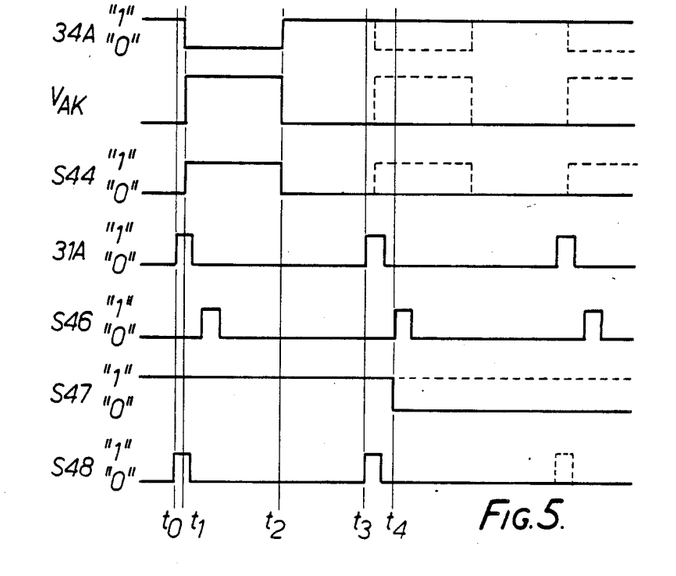
FIG. 5 is a time chart to explain the operation of the circuit shown in FIG. 4.

FIG. 5 shows a time chart to explain the operation of the circuit shown in FIG. 4. Assuming that the GTO thyristor 22A has been operating normally, at a time t0 the control signal 31A is changed from the "0" level to the "1" level by the gate control circuit 30. At a time shortly before the time t0, the levels of the signals are assumed to be as shown in FIG. 5. As the output signal S47 is at the level "1", the control signal 31A is applied to the off-gate circuit 10 through the AND circuit 48. The off-gate circuit 10 turns off the GTO thyristor 22A based on the control signal 31A. At a time t1 shortly after the time t0, the GTO thyristor 22A is turned off and the voltage $V_{AK}$ between the anode and the cathode of the GTO thyristor 22A becomes large. The photo-coupler 43 in the detector 33A detects the change of the voltage $V_{AK}$ and changes the signal 34A from the level "1" to the level "0". The signal S44 changes from the level "0" to the level "1" based on the signal 34A and is applied to the set terminal of the flip-flop circuit 47. At this time, the signal S47 at the Q terminal of the flip-flop circuit 47 is at the level "1", the flip-flop circuit 47 continues to be in the set state. At a time t2 the GTO thyristor 22A is turned on by an on-gate circuit (not shown). Assuming that the GTO thyristor 22A fails between the time t2 and a time t3, the control signal 31A is changed from the "0" level to the level "1" by the gate control circuit 30 at the time t3. At the time t3 the signal S47 of the flip-flop circuit 47 is at the level "1", so that the control signal 31A is applied to the off-gate circuit 10 through the AND circuit 48. The off-gate circuit 10 operates to turn off the GTO thyristor 22A based on the control signal 31A. But as the GTO thyristor 22A is in failure and the portions between the anode and the cathode thereof is completely short-circuited, the voltage $V_{AK}$ between the anode and the cathode is zero volts. Accordingly the signal 34A of the detector 33A is at the level "1". The NOT circuit 44 does not produce the signal S44 as shown in the dotted line in FIG. 5. Instead, the signal S46 is applied through the AND circuit 45 to the reset terminal of the flip-flop circuit 47. As a result the flip-flop circuit 47 is reset at a time t4 and the signal S47 is changed to the level "0" from the level "1". After that the control signal 31A is blocked at the drive circuit 32A, so that the signal S48 which is to be applied to the transistor 14 of the off-gate circuit 10 shown in FIG. 1 is stopped. Thus the off-gate circuit 10 stops applying the off-gate current to the failed GTO thyristor 22A. In FIG. 5 the dotted lines indicate the levels of the signals when the GTO thyristor 22A does not fail.

In the case that the other GTO thyristors 22B, 22C and 22D fail, the respective off-gate circuits stop applying the off-gate currents to the failed GTO thyristors 22B, 22C and 22D, respectively.

Figure 6:
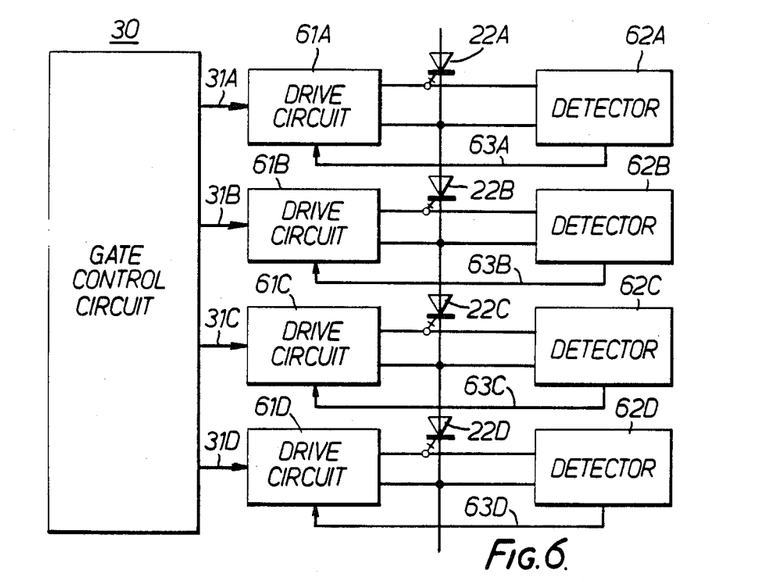
FIG. 6 is a block diagram illustrating partially a second preferred embodiment of this invention.

FIG. 6 is a block diagram illustrating partially a second preferred embodiment of this invention, which is used in regard to each of the arms U, V, X and Y in FIG. 2, instead of the circuit shown in FIG. 3. In FIG. 6, the control signals 31A, 31B, 31C and 31D from the gate control circuit 30 are applied to the drive circuits 61A, 61B, 61C and 61D, respectively. Detectors 62A, 62B, 62C and 62D detect reverse voltages between the gates and the cathodes of the serially connected GTO thyristors 22A, 22B, 22C and 22D and output signals 63A, 63B, 63C and 63D based on the detected reverse voltages to the drive circuits 61A, 61B, 61C and 61D so as to control the operations of the drive circuits 61A, 61B, 61C and 61D, respectively. In FIG. 6, the failures of the GTO thyristors 22A, 22B, 22C and 22D are detected by detecting the reverse voltage between the gates and the cathodes thereof, respectively.

Figure 7:
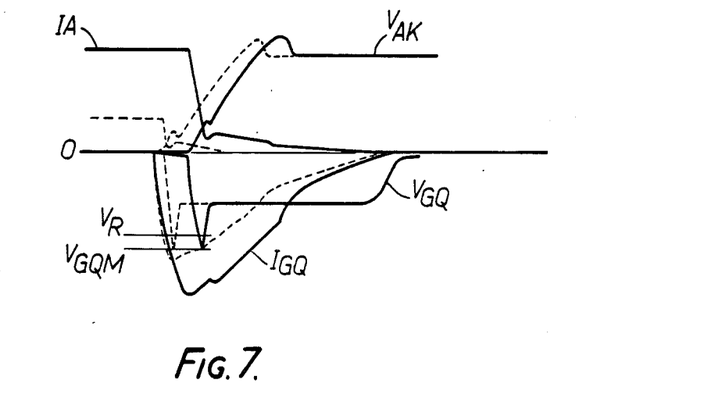
FIG. 7 is a waveform observed when a GTO thyristor is turned off.

FIG. 7 shows a waveform observed when a GTO thyristor is turned off, wherein reference character $I_A$ designates an anode current, $V_{AK}$ designates the voltage between the anode and the cathode, $I_{GQ}$ designates an off-gate current and $V_{GQ}$ designates an off-gate voltage of the GTO thyristor, respectively. The respective dotted lines show waveforms observed when the anode current $I_A$ is relatively smaller. When the GTO thyristor is normally operating, a Zener characteristic voltage $V_{GQM}$ ($-20$ volts through $-30$ volts, for example) appears between the cathode and the gate after the GTO thyristor is turned off. The amount of the voltage $V_{GQM}$ is substantially constant for the variation of the anode current $I_A$, as is shown in FIG. 7. So that, whether or not the GTO thyristor has failed can be detected by detecting whether or not the voltage $V_{GQM}$ appears.

Figure 8:
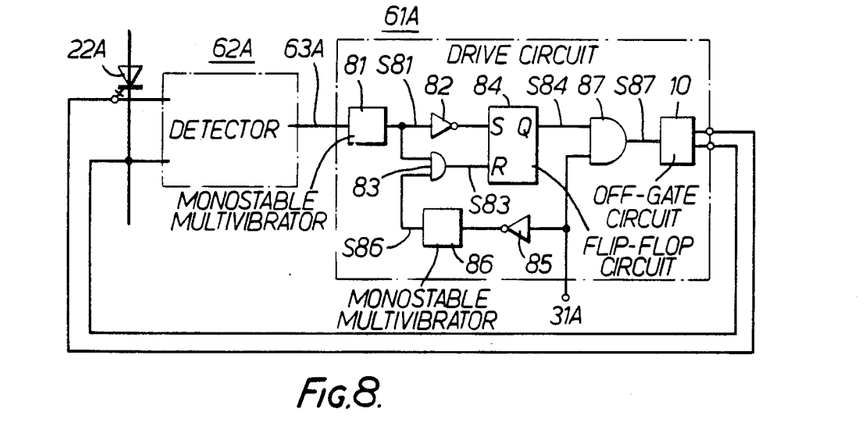
FIG. 8 is a detailed circuit diagram of the drive circuit 61A and the detector 62A shown in FIG. 6.

FIG. 8 shows an example of a circuit configuration of the drive circuit 61A and the detector 62A. In FIG. 8, the drive circuit 61A includes a monostable multivibrator 81, a NOT circuit 82, an AND circuit 83, a flip-flop circuit 84, a NOT circuit 85, a monostable multivibrator 86, an AND circuit 87 and the off-gate circuit 10 shown in FIG. 1. The signal 63A outputted from the detector 62A is applied to the input terminal of the monostable multivibrator 81. The monostable multivibrator 81 produces a shaped signal S81 based on the signal 63A which is applied to the input terminal of the NOT circuit 82 and to a first input terminal of the AND circuit 83. The control signal 31A from the gate control circuit 30 is applied to the input terminal of the monostable multivibrator 86 through the NOT circuit 85. An output signal S86 of the monostable multivibrator 86 is applied to a second input terminal of the AND circuit 83. The output terminal of the NOT circuit 82 is connected to a set terminal of the flip-flop circuit 84. An output signal S83 of the AND circuit 83 is applied to a reset terminal of the flip-flop circuit 84. An output signal S84 at a Q terminal of the flip-flop circuit 84 is applied to a first input terminal of the AND circuit 87. The control signal 31A is also applied to a second input terminal of the AND circuit 87. An output signal S87 of the AND circuit 87 is applied to the base terminal of the transistor 14 in the off-gate circuit 10. The detector 62A detects the reverse voltage $V_{GQ}$ between the gate and the cathode of the GTO thyristor 22A and outputs the signal 63A. The signal 63A becomes the level "0" when the detected reverse voltage $V_{GQ}$ is lower than a predetermined voltage $V_R$ which is determined to be a little higher than the Zener characteristic voltage $V_{GQM}$ as shown in FIG. 7, and becomes the level "1" when the detected reverse voltage $V_{GQ}$ is not lower than the predetermined voltage $V_R$. The detector 62A can easily be constructed by those skilled in the art based on the above description, so that the detailed description of the construction of the detector 62A will be omitted. The drive circuits 61B, 61C and 61D and the detectors 62B, 62C and 62D are constructed the same as the drive circuit 61A and the detector 62A, respectively.

Figure 9:
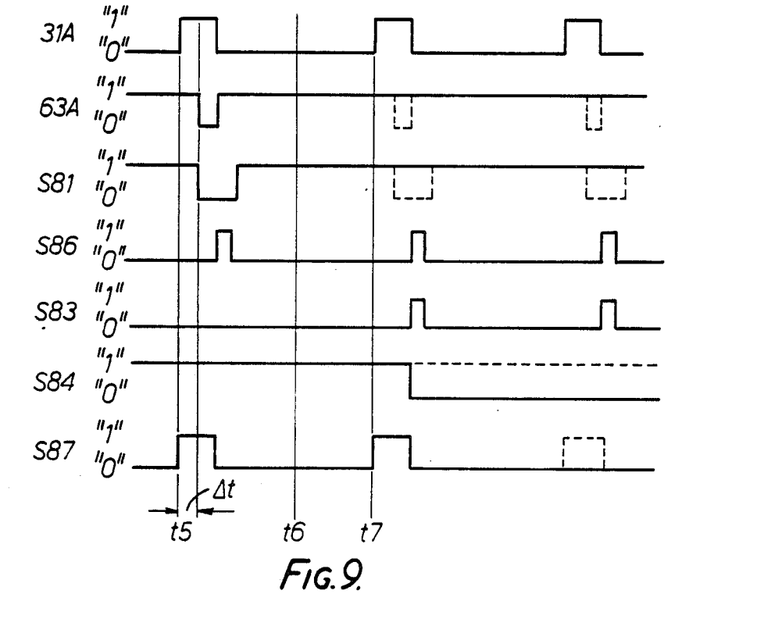
FIG. 9 is a time chart to explain the operation of the circuit shown in FIG. 8.

FIG. 9 shows a time chart to explain the operation of the circuit shown in FIG. 8. Assuming that the GTO thyristor 22A has been operating normally, at a time t5 the control signal 31A is applied to the drive circuit 61A from the gate control circuit 30. When the GTO thyristor 22A is turned off by the off-gate circuit 10 based on the control signal 31A, the voltage $V_{GQM}$ appears between the cathode and the gate of the GTO thyristor 22A with a time delay $\Delta t$. The detector 62A detects the voltage $V_{GQM}$ and outputs the signal 63A of the level "0" as shown in FIG. 9. The flip-flop circuit 84 is in the set state at the time t5 and remains as being set by the signal S81 shaped by the monostable multivibrator 81, so that the signal S84 of the Q terminal of the flip-flop circuit 84 remains to be at the level "1". At a time t6 the GTO thyristor 22A is turned on by an on-gate circuit (not shown). Assuming that the GTO thyristor 22A fails between the time t6 and a time t7, at the time t7 the control signal 31A is applied to the drive circuit 61A. The off-gate circuit 10 operates to turn off the GTO thyristor 22A based on the control signal 31A. But as the GTO thyristor 22A has failed and the portion between the cathode and the gate thereof is completely short-circuited, the voltage $V_{GQM}$ does not appear between the cathode and the anode of the failed GTO thyristor 22A. Accordingly, the signals 63A and S81 remain at the levels "1" and the signals shown by the dotted line do not appear, so that the flip-flop circuit 84 is reset by the signal S86 of the monostable multivibrator 86 and the signal S84 is changed from the level "1" to the level "0". Then the control signal 31A is blocked in the drive circuit 61A, and the signal S87 which is to be applied to the transistor 14 of the off-gate circuit shown in FIG. 1 is stopped. Thus the off-gate circuit 10 stops applying the off-gate current to the failed GTO thyristor 22A. In the case that the other GTO thyristors 22B, 22C and 22D fail, the respective off-gate circuits stop applying the off-gate currents to the failed GTO thyristors 22B, 22C and 22D, respectively. In FIG. 9 the dotted lines indicate the levels of the signals when the GTO thyristor 22A does not fail.

Figure 10:
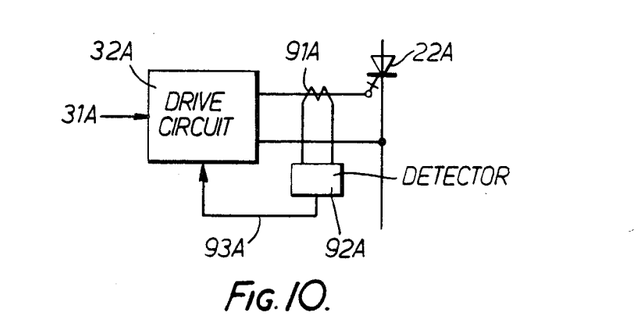
FIG. 10 is a block diagram illustrating only partially a third embodiment of this invention.

FIG. 10 is a block diagram illustrating only partially a third embodiment of this invention. In FIG. 10, a gate current of the GTO thyristor 22A is detected by a current transformer 91A and is applied to a detector 92A. When the detector 92A detects that a magnitude of the thus detected current deviates from a specified value, the detector 92A outputs a fault detecting signal 93A to the drive circuit 32A so as to stop supplying the off-gate current to the failed GTO thyristor 22A. Usually, if the GTO thyristor fails and the portion between the gate and the cathode thereof has been short-circuited, an off-gate current of the GTO thyristor becomes 1.5 to 2 times the off-gate current thereof in normal operation, so that detection of the failed GTO thyristor can be readily made. The detector 92A can easily be constructed by those skilled in the art based on the above description, so that the detailed description of the construction of the detector 92A will be omitted.

Figure 11:
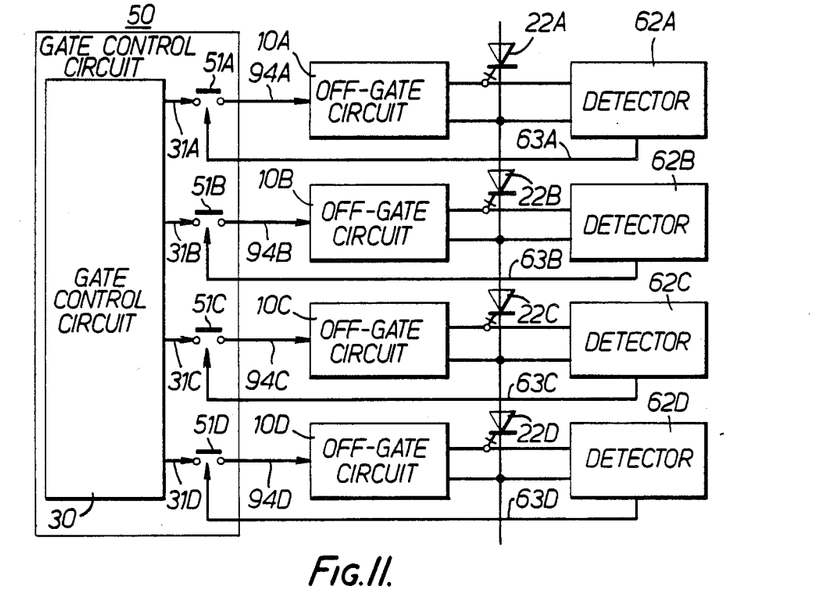
FIG. 11 is a block diagram illustrating only partially a fourth embodiment of this invention.

FIG. 11 is a block diagram illustrating only partially a fourth embodiment of this invention. The detectors 62A, 62B, 62C and 62D are connected between the cathodes and the gates of the GTO thyristors 22A, 22B, 22C and respectively 22D, and output the signals 63A, 63B, 63C and 63D, to a gate control circuit 50. The gate control circuit 50 includes the gate control circuit 30 and switches 51A, 51B, 51C and 51D and is modified so as to block only the control signals 31A, 31B, 31C and 31D with respect to the GTO thyristors 22A, 22B, 22C and 22D upon failure thereof by means of the switches 51A, 51B, 51C and 51D based on the signals 63A, 63B, 63C and 63D and produces modified control signals 94A, 94B, 94C and 94D, respectively. The modified control signals 94A, 94B, 94C and 94D are applied to the base terminals of the transistor 14 in off-gate circuits 10A, 10B, 10C and 10D, respectively. Each of the off-gate circuits 10A, 10B, 10C and 10D has the same construction as that of the off-gate circuit 10 shown in FIG. 1. The off-gate circuits 10A, 10B, 10C and 10D generate off-gate signals which are applied between the cathodes and the gates of the GTO thyristors 22A, 22B, 22C and 22D, respectively. Here, the signals 63A, 63B, 63C and 63D may be transmitted to the gate control circuit 50 by electrical means or by optical means; however, such means are well known to those skilled in the art, so that the detailed description thereof is omitted.

Figure 12:
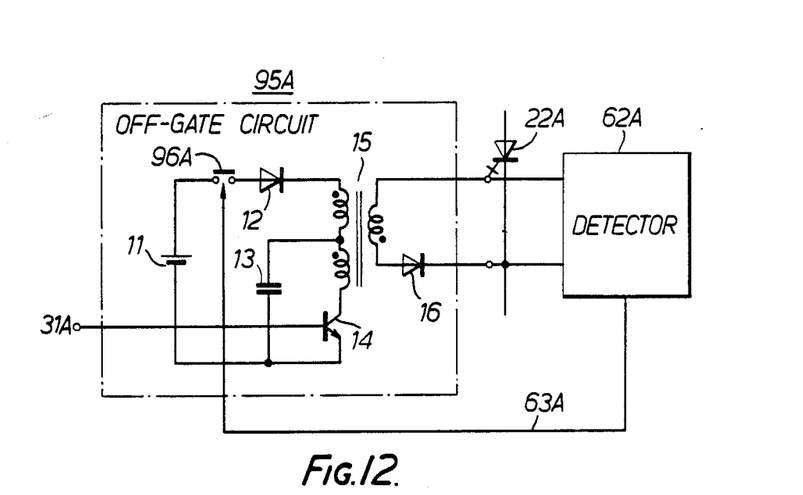
FIG. 12 is a block diagram illustrating only partially a fifth embodiment of this invention.

FIG. 12 is a block diagram illustrating only partially a fifth embodiment of this invention. In FIG. 12, the detector 62A is connected between the cathode and the gate of the GTO thyristor 22A and outputs the signal 63A to an off-gate circuit 95A. The off-gate circuit 95A has the same construction as the off-gate circuit 10 except that a switch 96A is provided between the DC power source 11 and the diode 12. The signal 63A is applied to the switch 96A so that it opens the switch 96A when the signal 63A indicates that the GTO thyristor 22A has failed. The control signal 31A is appliedto the base terminal of the transistor 14 of the off-gate control circuit 95A.

As above described, the detectors 33A, 33B, 33C and 33D have been described with examples utilizing a photo-coupler 43. But this invention is not limited to this embodiment. Any other component such as a pulse transformer that can transmit a signal while keeping insulation can be used instead of the photo-coupler.

Moreover, this invention is described with respect to embodiments wherein GTO thyristors are used, but this invention can be applied to power converters constructed of a plurality of self-turn-off semiconductor elements such as static induction thyristors, power transistors and field effect transistors.

In the embodiment shown in FIG. 2, a single-phase inverter is used as a power converter. But this invention is widely applicable to power converters such as inverters, choppers and converters.

As described above, according to this invention, when a power converter such as an inverter, a chopper and a converter which is constructed of a plurality of serially connected self-turn-off semiconductor elements is designed to maintain continuous operation even when at least one element is failed, control of non-conduction with respect the failed element is stopped, thereby eliminating the need to unnecessarily make the components of the control circuit larger in size and capacity, so that there can be provided a highly economical and reliable power converter.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A power converter, comprising:
   a plurality of serially connected self-turn-off semiconductor elements;
   first control circuit means for producing a plurality of first control signals;
   plural second control circuit means connected to said first control circuit means for receiving respective of said first control signals and for producing and supplying non-conduction control signals to respective of said self-turn-off semiconductor elements to turn off said respective elements upon reception of said first control signals;
   a plurality of failure detection means connected to respective of said self-turn-off semiconductor elements for detecting a fault thereof and for producing a fault detection signal when the respective of said self-turn-off semiconductor elements has failed; and
   a plurality of blocking means connected to respective of said failure detection means and to said first control circuit means for blocking at least a selected one of asid first control signals and said non-conduction control signals upon detection of a failure in the respective self-turn-off semiconductor element so that a non-conduction control signal is not produced and not applied to the failed semicondcutor element and the remaining non-failed self-turn-off semiconducctor elements continue to have respective non-conduction signals produced and supplied thereto.

2. The power converter according to claim 1, wherein:
   each of said failure detection means includes a detector connected between a positive electrode and a negative electrode of a respective of said self-turn-off semiconductor elements for detecting a voltage between said positive electrode and said negative electrode to produce respective of said fault detection signals based on said voltage.

3. The power converter according to claim 1, wherein:
   each of said failure detection means includes a detector connected between a control electrode and a negative electrode of a respective of said self-turn-off semiconductor elements for detecting a voltage between said control electrode and said negative electrode to produce the respective of said fault detection signals based on said voltage.

4. The power converter according to claim 1, wherein:
   each of said failure detection means includes a detector connected between an output terminal of a respective of said second control circuit means and a control electrode of each of said self-turn-off semiconductor elements for detecting a current flowing between said output terminal and said control electrode to produce the respective of said fault detection signals based on said current.

5. The power converter according to claim 1, wherein:

each of said blocking means is further connected to each of said second control circuit means to block each of said non-conduction control signals based on each of said fault detection signals.

6. The power converter according to claim 5, wherein:
each of said blocking means includes means connected to receive a respective of said first control signals for preventing said respective of said first control signals from being supplied to a respective of said second control circuit means to block the respective of said non-conduction control signals based on the respective of said fault detection signals.

7. The power converter according to claim 5, wherein:
each of said blocking means includes means for preventing a power source from being supplied to a respective of said second control circuit means to block the respective of said non-conduction control signals based on the respective of said fault detection signals.

8. The power converter according to claim 1, wherein:
said self-turn-off semiconductor element includes a gate turn-off thyristor.

9. A power converter, comprising:
a plurality of serially connected gate turn-off thyristors;
gate control circuit means for producing a plurality of control signals;
plural off-gate circuit means connected to said gate control circuit means for receiving respective of said control signals to produce and supply an off-gate signal to a respective of said gate turn-off thyristors to turn said respective gate-turn-off thyristors off;
a plurality of failure deedtion means connected to respective of said gate turn-off thyristors for detecting a failure thereof produce a fault detection signal when the respective of said gate turn-off thyristors has failed; and
a plurality of blocking means connected to respective of said failure detection means and to said gate control circuit means for blocking at least one of a respective of said control signals and said off-gate signals upon detection of a failure in the respective gate turn-off thyristor so that an off-gate signal is not supplied to the failed thyristor and the remaining non-failed thyristors continue to have respective off-gate signals produced and supplied thereto.

* * * * *